(12) United States Patent
Saldanha

(10) Patent No.: US 12,535,160 B2
(45) Date of Patent: Jan. 27, 2026

(54) BOILER BURNER RIGID LANCE

(71) Applicant: PETRÓLEO BRASILEIRO S.A.—PETROBRAS, Rio de Janeiro (BR)

(72) Inventor: Wagner Henrique Saldanha, Betim (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 91 days.

(21) Appl. No.: 18/451,776

(22) Filed: Aug. 17, 2023

(65) Prior Publication Data

US 2024/0060639 A1  Feb. 22, 2024

(30) Foreign Application Priority Data

Aug. 18, 2022 (BR) ...................... 20 2022 016480 6

(51) Int. Cl.
*F16L 19/02* (2006.01)
*F23D 11/38* (2006.01)

(52) U.S. Cl.
CPC .......... *F16L 19/0218* (2013.01); *F23D 11/38* (2013.01); *F23D 2202/00* (2013.01)

(58) Field of Classification Search
CPC ... F16L 19/0212; F16L 19/0218; F23D 11/38; F23D 2202/00
See application file for complete search history.

(56) References Cited

U.S. PATENT DOCUMENTS

| | | | |
|---|---|---|---|
| 5,251,941 A * | 10/1993 | McGarvey | F16L 19/0218 |
| 5,505,464 A * | 4/1996 | McGarvey | F16L 19/0218 |
| 6,145,888 A * | 11/2000 | Ohmi | F16L 19/0218 |
| 6,273,477 B1 * | 8/2001 | Ohmi | F16L 19/0212 |
| 6,390,512 B1 * | 5/2002 | Corbett | F16L 19/0212 |
| 11,655,921 B2 * | 5/2023 | Morenko | F16L 19/0212 |
| 2005/0275222 A1 * | 12/2005 | Yoakam | F16L 19/0218 |
| 2012/0073323 A1 * | 3/2012 | Lockwood | F16L 19/0218 |
| 2014/0110937 A1 * | 4/2014 | Okabe | F16L 19/0218 |

FOREIGN PATENT DOCUMENTS

| | | |
|---|---|---|
| EP | 3 948 076 | 5/2023 |
| JP | 6175324 B2 | 8/2017 |

* cited by examiner

*Primary Examiner* — Zachary T Dragicevich
(74) *Attorney, Agent, or Firm* — Knobbe, Martens, Olson & Bear, LLP

(57) ABSTRACT

Generally described, one or more aspects of the present disclosure relate to a rigid lance of a boiler burner device. The rigid lance includes a first tube having a first diameter, a second tube having a second diameter larger than the first diameter, a hexagonal bar connecting the first tube with the second tube, and a sealing gasket positioned between the first tube and the second tube.

3 Claims, 3 Drawing Sheets

BOILER BURNER RIGID LANCE

FIELD OF APPLICATION

The present utility model pertains to the field of energy generating devices, in the gas-chemistry area. More precisely, the present utility model is related to the description of devices to provide burning to boilers, especially boilers arranged in operational spaces of restricted, reduced sizes.

STATE OF THE ART

Boilers are equipment used in the production and accumulation of steam, under conditions of pressure greater than atmospheric pressure, using a range of energy sources. As devices to provide burning to the boiler, boiler burners are used, which can be defined as equipment that promote adequate and controlled burning of a fuel in suspension, enabling the production of a flame that heats water in a liquid state in order to transform the same into steam.

In particular, in a non-limiting way, the present utility model aims at providing a rigid lance for use in boilers that operate in oil burning. Precisely, when a boiler of this order was found in an environment of reduced space, with little access and field for corrective operations, or even scheduled maintenance, oil lances needed to be mounted using flexible lances, in the form of flexible hoses. However, the flexibility of the used materials impairs the positioning of the burner nozzle in relation to the boiler, directly and undesirably influencing the proper functioning of the boiler. In addition, as expected, the flexibility of the materials used in these flexible lances implies excessive wear, demanding excessive replacements and increasing related operating costs.

In the state of the art, document JP6175324B2 is found, which describes a clinker removal device comprising a lance tube (2) consisting of the connection of a first lance tube (2-1) with a nozzle (1) for injecting high pressure injection fluid, with a second lance tube (2-3) having a fluid introduction part (7), and having connection parts (4-1 and 4-2) for connecting the first and the second lance tubes (2-1 and 2-3) at both ends. JP6175324B2 envisages a plurality of guide members (3) that are provided slidable in a gap between the lance tube (2) and a sleeve-like member (5), arranged on a peripheral external surface of the tube (2), penetrating on the furnace wall. The connections between parts proposed in this document JP6175324B2 bring its matter to a comparison with the utility model. However, it is important to note that, for the case of the target diameter of the tubes applicable to the present utility model, it would not be possible to implement a structure close to what is described in this document, since, for example, threads in both parts under connection would not find sufficient tube thickness capable of withstanding, so that the tube would become fragile, generating serious operational risks, such as oil leakage and possible fire. Therefore, applying a solution based on the description provided by document JP6175324B2 would generate large losses, making this solution way unfeasible. In addition, it is further observed that document JP6175324B2 does not provide for a connection between tubes to allow the application of a given boiler with a given burner in limited spaces. Therefore, the target problem of the present utility model does not coincide with the problem of JP6175324B2, reinforcing the understanding that the application of its description to the objectives of the utility model would not meet its needs.

Additionally, EP3948076A1 is identified in the state of the art, which describes a burner lance 200 attached to a nozzle 310 to supply first fluid and second fluid in a furnace 124 of a boiler 120. It was found that such a burner lance 200 can be kept in a small space by separating a part of the lance from the burner. EP3948076A1 proposes to detach a second part 200b of the burner lance 200 from a first part 200a of the burner lance 200. The order of the first and second parts 200a, 200b is defined such that the first part is fixed to the nozzle 310 or is attachable to the nozzle 310. In particular, a primary end 204a of the first part 200a is attached or attachable to the nozzle 310. Likewise, the nozzle 310 is attached or attachable to the primary nozzle end 204a of the first part 200a. The primary end 204a of the first part 200a is opposite a secondary end 205a of the first part 200a, which secondary end 205a is attached or attachable to the second part 200b. Notwithstanding, it should be noted that the present utility model is applicable to a scenario wherein only one fluid is circulated by the burner, in a constructive structure contrary to the proposed system that is object of document JP6175324B2 consisting of a plurality of elements interacting with each other. Therefore, the simple application of the knowledge of EP3948076A1 to the objectives of the present utility model does not allow achieving a burner assembly in physical spaces with limited space between the boiler and the oil lance assembly region, eliminating the use of flexible hoses in this assembly.

In this sense, even considering the techniques available in the field of application, it was necessary to develop equipment in the shape of a lance, consisting of rigid materials, capable of being assembled even in environments with little space, as it is presented in a modular way. It is in this scenario that the present model appears, wherein the proposed device, in the shape of a lance, which is a rigid lance, allows a correct positioning of the boiler burner nozzle and, finally, presents prolonged operation, since an excessive wear is no longer observed.

With the achieved solution, the described rigid lance can be applied to different types of boilers that are arranged in environments with reduced space and that require correct positioning of the burner nozzle.

BRIEF DESCRIPTION OF THE UTILITY MODEL

The present utility model describes a device in the shape of a rigid lance to be used in a boiler burner, preferably an oil boiler, wherein the rigid lance comprises a metallic and modular structure. More specifically, the structure of the present utility model comprises a hexagonal bar interconnecting a first tube with a second tube of a larger diameter than the diameter of the first tube, wherein between the first tube and the second tube the arrangement of a sealing gasket is provided.

Particularly, the first tube presents a longitudinally extended body, with the first end coinciding with most of its longitudinal structure and a second end provided with a shoulder. Meanwhile, the second tube comprises a longitudinally extended body, with its first end provided with an external threaded portion followed by the continuation of its extended body in smooth shape. To enable the interconnection between both first and second tubes, the hexagonal bar has part of its interior provided with internal threads, and a second part of its interior presented in smooth shape.

BRIEF DESCRIPTION OF FIGURES

FIG. 4 is a photograph illustrating an example of a physical space available for removing the lance, while

DETAILED DESCRIPTION OF THE UTILITY MODEL

The present utility model aims at describing a lance applicable to a boiler burner, preferably, but not limited to, an oil boiler, the lance being presented in a rigid shape. By means of the device disclosed herein, it becomes possible to carry out maintenance, assembly, disassembly and replacement of oil lances for boiler burners that are operational in places with limited space. The lance provided by the present utility model comprises a modular structure consisting of rigid elements, which allows achieving a correct positioning of the burner nozzle using this lance, in relation to the boiler. Consequently, it is guaranteed that the boiler operates under ideal operating conditions, once the burning in the burner portion is controlled. For this purpose, the device disclosed in the present utility model comprises a hexagonal bar 1 that provides the interconnection of a first tube 2 to be interconnected with a second tube 4 of greater diameter, wherein between the first tube 2 and the second tube 4 the arrangement of a sealing gasket 3 is provided.

In order to preserve the features that provide to the device the condition of a rigid structure, the elements such as the first tube 2, the second tube 4 and the hexagonal bar 1 are preferably made of metallic material, for example, carbon steel. It should be noted that the lance provided by the present utility model has full adequacy capacity in relation to its dimensions. In practice, it is possible to adapt the total dimension of the lance and its segments in modules to suit a wide variety of boilers, depending on the space available for removing/inserting the lance. With regard specifically to the thickness, a technician skilled on the subject is clearly able to recognize that the thickness must vary according to the safety conditions that meet the determined pressure in each application.

Figure 1:
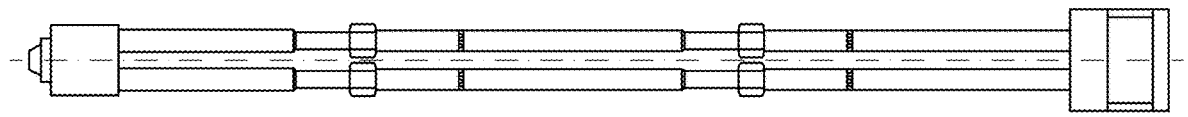
FIG. 1 is a graphical representation of the lance of the present utility model in the assembled condition, with the burner nozzle positioned.
Figure 3:
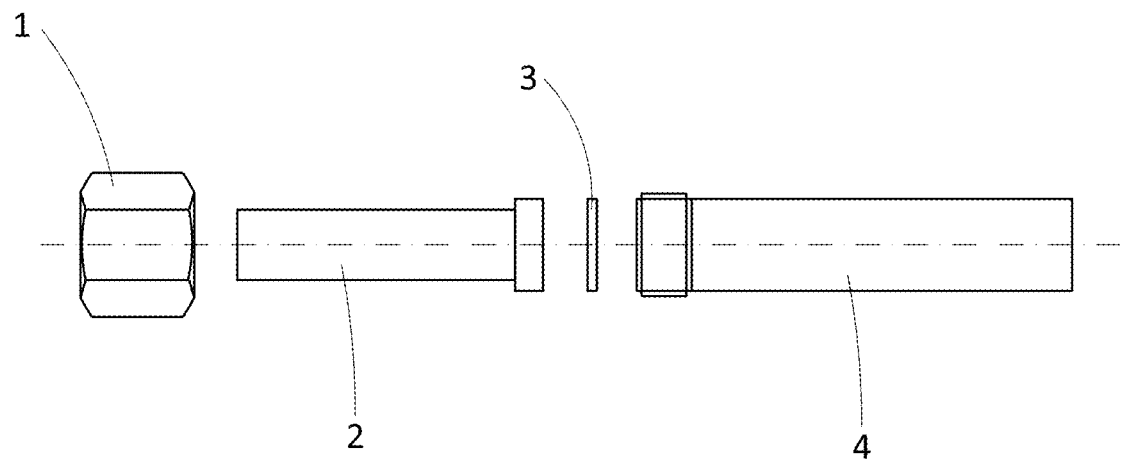
FIG. 3 is a graphic representation of the rigid lance of the present utility model, without receiving the burner nozzle, in the disassembled condition.
Figure 4:
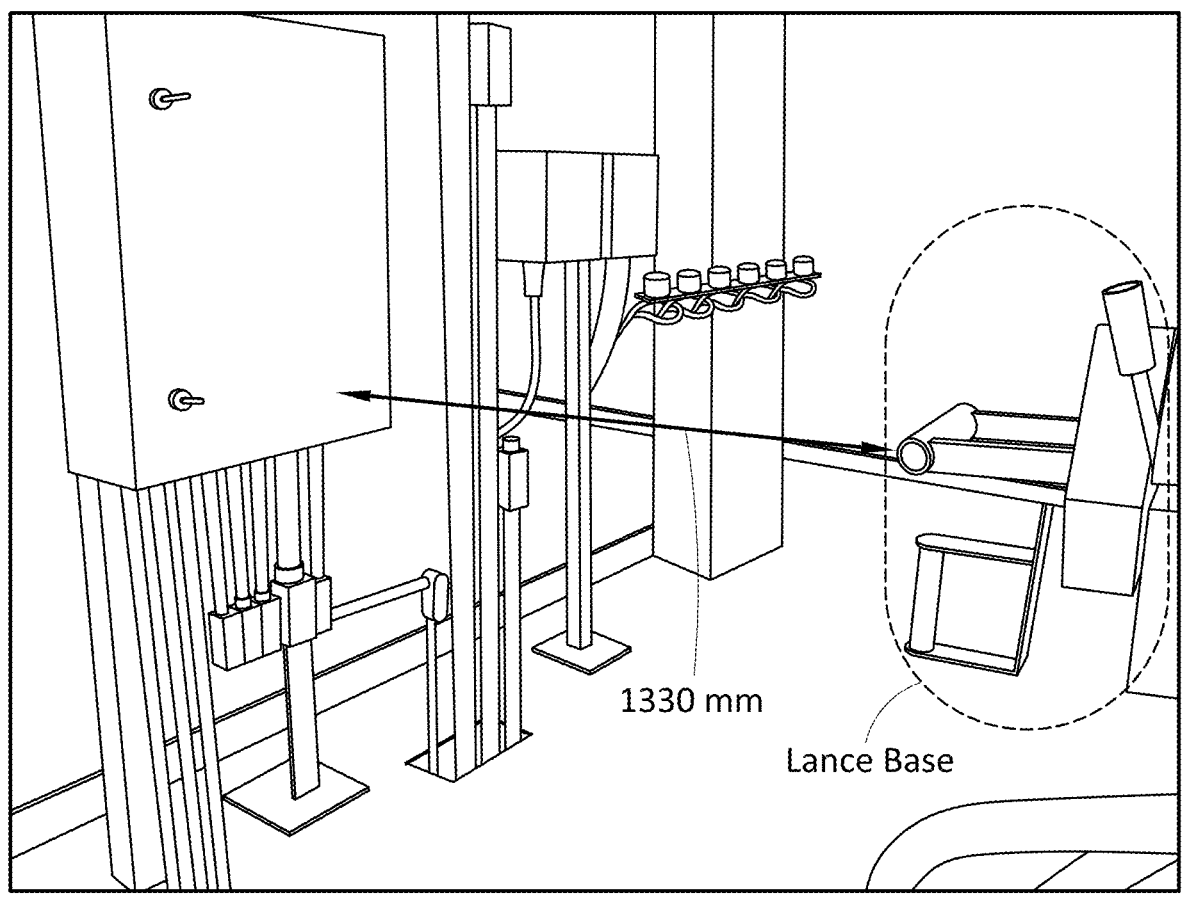
Figure 5:
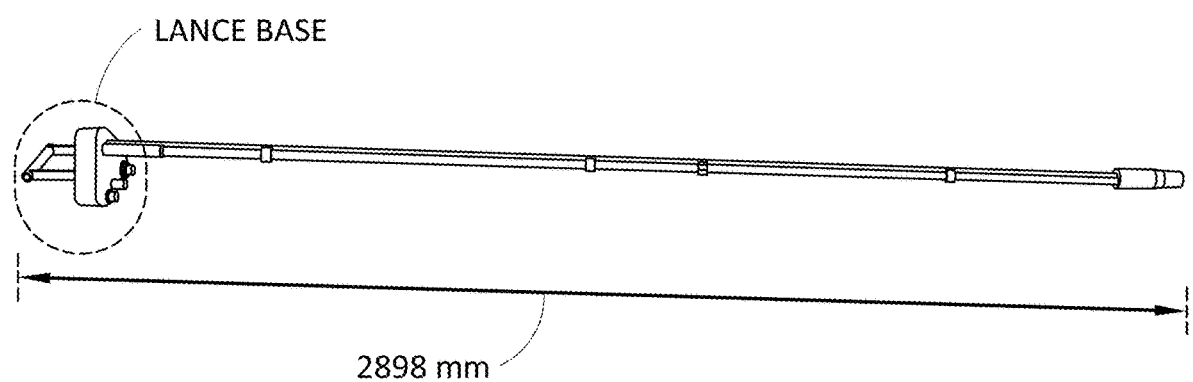
FIG. 5 represents the lance in its effective length in this exemplary embodiment.

In particular, FIG. 3 is a graphic representation of the rigid lance of the present utility model, without receiving the burner nozzle. The view represented in FIG. 3 is a view wherein the component elements of the lance are seen separately, but side by side, in order to illustrate how their positioning is composed in the final structure of the utility model. In turn, FIG. 1 presents a graphical representation of the lance of the present utility model in an assembled condition, with the burner nozzle positioned.

Precisely, the tube 2 to be interconnected appears as a longitudinally extended body, with the first end coinciding with most of its longitudinal structure. The second end of the tube 2 has a shoulder, wherein said shoulder makes the diameter of that second end compatible with the diameter of the first end of the tube 4. The compatibility between the second end of the tube 2 and the first end of the tube 4 coincides with the structure of the sealing gasket 3. Accordingly, the second tube 4 appears as a longitudinally extended body. Its first end, as previously reported, has a shape and dimension compatible with the second end of the tube 2. In addition, the first end of the tube 4 has an external threaded portion responsible for receiving an internal thread available on the hexagon bar 1. After that threading, the longitudinally extended body of the tube 2 continues until it ends, representing its second end.

As to the hexagonal bar 1, this has part of its interior provided with internal threads (ii), while the second portion of its interior is smooth (i).

Regarding the sealing gasket, the selection of this element can be made based on commercially available sealing gaskets for suitable conditions of temperature, pressure and fluid in use, such as, for example, a Teadit TJE.

Figure 2:
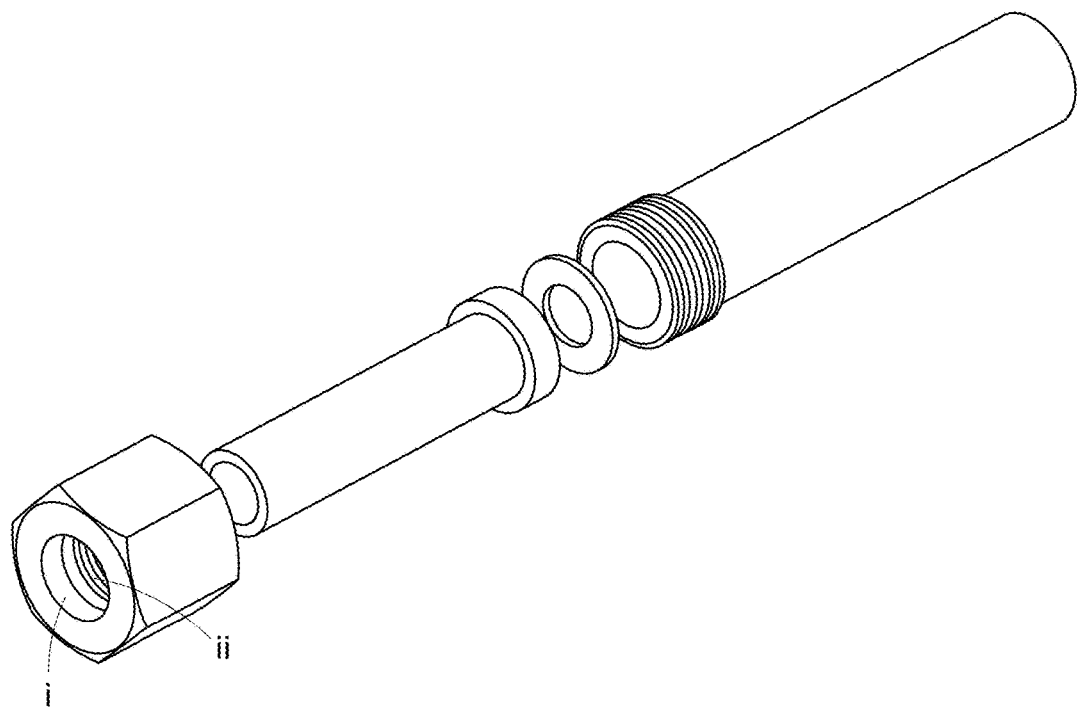
FIG. 2 is a representation of the rigid lance of the present utility model illustrating internal details of the tubes to be connected.

Consequently, especially referring to the graphic image available in FIG. 2, it is possible to observe that the hexagonal bar 1 is inserted from the first end of the tube 2, initially by its threaded portion ii. Thus, the hexagonal bar crosses the tube 1 longitudinally until it passes through the shoulder of the second end of the tube 2. At this point, the sealing joint is covered by the hexagonal bar 1 and the hexagonal bar 1 itself begins the threading with the first portion of the tube 4 provided with external threads. Once the threading is complete, the rigid lance is assembled, sealed and ready for use.

The final structure presented is a rigid, safe and sealed structure, completely adaptable in terms of size and diameter to suit the most diverse boilers available. Additionally, as a result, the present utility model makes it possible to achieve a robust structure, with much less wear than observed in previously available techniques in the field of this matter.

It should be clear that the matter defined in the present specification is presented in terms of its preferred embodiment, and that modifications can be applied to the conditions defined herein and are still encompassed by the scope as defined and claimed in the present application.

What is claimed is:

1. A rigid lance of a boiler burner device, the rigid lance comprising:
   a first tube having a longitudinally extended body, the longitudinally extending body including a first end, a second end comprising a shoulder, a first length, and a first diameter, wherein the first length is longer than the first diameter;
   a second tube having a longitudinally extended body with a first end comprising an external threaded portion, a second end, a second length, and a second diameter larger than the first diameter, wherein the second length is longer than the second diameter;
   a sealing gasket positioned between the second end of the first tube and the first end of the second tube and adjacent to the shoulder;
   a hexagonal bar comprising a first face positioned against the shoulder of the first tube and a threaded portion connecting to the external threaded portion of the second tube such that the shoulder is positioned interior to the hexagonal bar and the first tube is connected to the second tube;
   a burner nozzle connected to the first end of the first tube; and
   wherein the burner nozzle and the first length of the first tube are configured to be inserted into a boiler; and
   wherein the longitudinally extending body of the first tube, the longitudinal extending body of the second tube, and the burner nozzle are coaxial.

2. The rigid lance of claim 1, wherein the hexagonal bar further comprises a threadless portion.

3. The rigid lance of claim 1, wherein a length of the rigid lance is approximately 3000 mm.

\* \* \* \* \*